United States Patent [19]

Ikeda et al.

[11] Patent Number: 4,601,191
[45] Date of Patent: Jul. 22, 1986

[54] OUTERRACE OF UNIVERSAL JOINT WITH CROSS GROOVES

[75] Inventors: Sadao Ikeda; Kunihiko Imahashi; Yasuo Iwata, all of Toyota, Japan

[73] Assignee: Toyota Jidosha Kabushiki Kaisha, Aichi, Japan

[21] Appl. No.: 711,650

[22] Filed: Mar. 14, 1985

[30] Foreign Application Priority Data

Apr. 18, 1984 [JP] Japan .................... 59-078094

[51] Int. Cl.$^4$ ........................... B21D 22/00
[52] U.S. Cl. ...................... 72/354; 72/358; 72/402
[58] Field of Search ............. 72/358, 370, 402, 367, 72/354, 352, 360; 29/159.1

[56] References Cited

U.S. PATENT DOCUMENTS

| 3,530,717 | 9/1970 | Gregg | 29/159.1 |
| 3,581,550 | 6/1971 | Waterbury | 72/402 |
| 4,470,288 | 9/1984 | Takeda | 72/402 |

Primary Examiner—Leon Gilden
Attorney, Agent, or Firm—Cushman, Darby & Cushman

[57] ABSTRACT

A method of forming an outerrace of a universal joint having cross grooves, in which its cylindrical portion is formed in its inner face with cross grooves by a plastic working process such as a forging process, an outerrace of a universal joint, which has its cylindrical and shaft portions integrally molded into a form having generally an outerrace shape from a single steel material and which is formed by forging thereof from above and all sides, and a process and an apparatus for producing the outerrace.

1 Claim, 13 Drawing Figures

OUTERRACE OF UNIVERSAL JOINT WITH CROSS GROOVES

BACKGROUND OF THE INVENTION

1. Field of the Invention

The present invention relates to an outerrace of a universal joint having cross grooves, which for example, is used to connect a reduction gear mechanism and a drive shaft at a drive wheel axle of independent suspension type of an automobile, and process and apparatus for producing that outerrace.

2. Description of the Prior Art

The cross groove type joint having cross grooves of the prior art is a universal one, in which six balls 3 are loosely fitted between a generally cylindrical innerrace 1 connected to the journal of a shaft and an outerrace 2 accommodating the innerrace 1 and are retained in a cage 4, as shown in FIGS. 1 and 2. This universal joint is formed in the outer circumference of the innerrace 1 and in the inner face of the cylindrical portion of the outerrace 2 with six cross grooves 5 which are symmetrically inclined at an equal angle with respect to one another for receiving the balls 3 thereby to effect a uniform motion and proper axial movement. Moreover, the conventional outerrace of the universal joint of the above-specified kind is composed of two parts, i.e., the cylindrical member having the cross grooves and a shaft member. This outerrace is generally classified into one of the type in which bolts 6 are inserted into bolt holes 7 to fasten a cylindrical member 8 and a shaft member 9 through a clip 10, as shown in FIGS. 1 and 2, and the other of the type in which a cylindrical member 8' and a shaft member 9' are frictionally welded, as shown in FIG. 3. In the conventional joint shown in FIG. 1, incidentally, a boot 12 is fitted on a seal adaptor 11 attached to the cylindrical member 8 and is fastened by a boot band 13 to seal the inside of the joint.

In the case of the outerrace of either type, the cross grooves 5 are formed one by one or two by two either by a cutting work (e.g., a broaching work) or by a grinding work. As a result, the forming takes a long time resulting in low productivity which raises production cost of the outerrace. In addition, the cross grooves formed by the cutting work are not always sufficient in strength or the like. On the one hand, the outerrace of the bolt-fastened type, as in the aforementioned example of the prior art, not only has a problem of looseness of the bolts but also requires the bolt holes so that it generally has its external diameter increased thereby increasing its weight.

On the other hand, the outerrace of the frictionally welded type requires a welding margin and has a welding fin and there results sometimes expansion and deformation due to the welding heat. In the welding operation, moreover, the cylindrical member and the shaft member may be misaligned with each other. Thus, the outerrace has a problem in precision.

SUMMARY OF THE INVENTION

An object of the present invention is to provide an outerrace of a universal joint having cross grooves, which has an excellent productivity thereby lowering the production cost, which has its strength improved with a small weight and which is small-sized and highly precise.

Another object of the present invention is to provide a process and an apparatus for producing an outerrace of a universal joint having cross grooves, which are useful for achieving the aforementioned objects.

The outerrace of a universal joint having cross grooves according to the present invention is characterized in that the cross grooves are formed in the inner face of the cylindrical portion of the outerrace by a plastic working process such as a forging forming process. The outerrace of the present invention may be composed of two parts, i.e., a cylindrical member having the cross grooves and a shaft member but may preferably be produced by plastic working a single steel material to take a form having an outerrace shape and by integrally forming the cylindrical portion and shaft portion of the outerrace.

DESCRIPTION OF THE PREFERRED EMBODIMENTS

Figure 1:
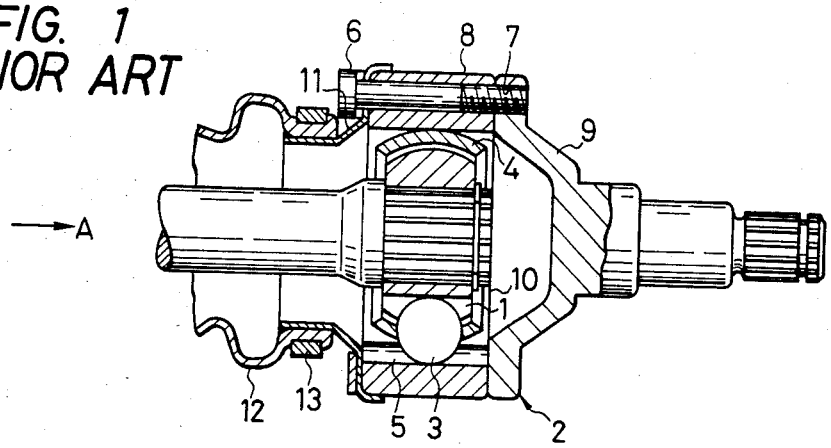
FIG. 1 is a sectional view (which is taken along line I—I of FIG. 2) showing the universal joint using the conventional outerrace having the cross grooves.
Figure 2:
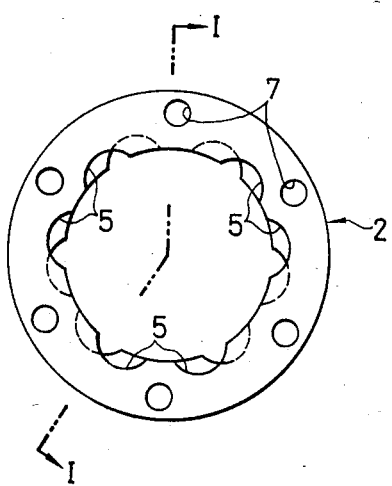
FIG. 2 is a view showing the outerrace of FIG. 1 and taken in the direction of arrow A of FIG. 1.
Figure 3:
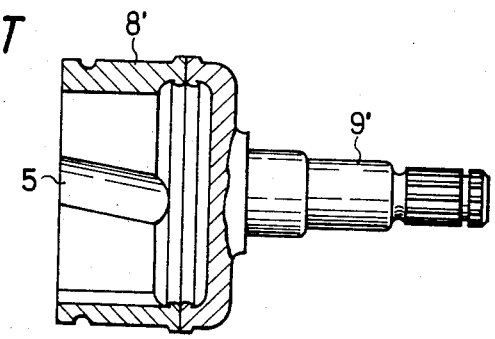
FIG. 3 is a sectional view showing the outerrace of the frictionally welded type of the universal joint having the cross grooves in accordance with the prior art.

For producing the outerrace of the present invention, the plastic working of the cross grooves and the forming of the outerrace or its cylindrical member may be conducted separately of each other but are simultaneously executed more efficiently. As this simultaneously working process, for example, the process is exemplified: by forging a single steel material preferably having a rod shape to form an element having generally an outerrace shape; by subsequently preparing a mandrel punch generally of column shape, in which six cross groove molds are so fitted in the outer circumference thereof at an equal angle with respect to one another and in an axially movable manner; by covering that mandrel punch with the element generally of an outerrace shape; and by subsequently pressing the element both from above the punch and sideway of the punch in all directions to form the six cross grooves and to mold the outerrace having its cylindrical and shaft portions integrally; and by subsequently subjecting the outerrace to a predetermined finishing working, if necessary. Here, as another preferable process for simultaneously pressing the material, the process is exemplified: by covering the aforementioned mandrel punch with the element generally of the outerrace shape and fitting an upper portion of said element in such a molding face of a backing mold disposed above said punch as corresponds to the shaft portion of the outerrace by pressing downward said backing mold; and simultaneously by forcing a plurality of such forming molds surrounding said punch toward the outer circumference of the mandrel punch which have molding faces corresponding to the respective portions of the outer circumference of the cylindrical portion of the outerrace, thereby to forge the aforementioned element.

Still another process for producing the outerrace is exemplified: by firstly preparing a mandrel punch generally of a column shape having in its outer circumference six molds having molding faces corresponding to the cross grooves, for example, the aforementioned cross groove molds; by fitting a material for the cylindrical portion of the outerrace on the punch; by subsequently pressing said material for the cylindrical portion sideways of the molds in all directions to form the six cross grooves and the cylindrical member of the outerrace; by subsequently drawing the cylindrical member from the molds; and by joining the cylindrical member of the outerrace thus attained and the shaft member of the outerrace worked in advance by means of a frictionally welding, a rotary arc and an electron beam thereby to produce the outerrace having the cross grooves.

Since the outerrace of the universal joint having the cross grooves according to the present invention has its cross grooves formed by the plastic working, its production requires neither the cutting nor grinding working of the cross grooves, which has been indispensable in the prior art. The working time of the cross grooves is so remarkably shortened that the productivity is improved greatly. As compared with the product of the prior art by the cutting working or the like, moreover, the cross grooves have their strength and durability increased. In addition, the production of the outerrace of the present invention is freed from the necessity of joining its components in the course of its production since the cylindrical portion and the shaft portion are integrally formed. This not only improves the productivity of the outerrace but also eliminates the problem in use of loosened bolts. Since it is unnecessary to drill the bolt holes, moreover, the outerrace can have its cylindrical portion thinned without any welding margin and fin so that it can have its weight and size reduced drastically. Furthermore, the outerrace is freed from any misalignment problem between its shaft portion and cylindrical portion so that it can be made highly precise. Because of the avoidance of the use of the bolts and so on, furthermore, the outerrace can be produced at a lower cost.

On the other hand, the apparatus for producing the outerrace of the universal joint in accordance with the present invention can produce the integrated outerrace by the single forging forming so that it can mass-produce the outerrace which is light, small-sized and highly precise, as has been described above.

The present invention will be described in the following in connection with the examples thereof with reference to the accompanying drawings.

EXAMPLE 1

Figure 4:
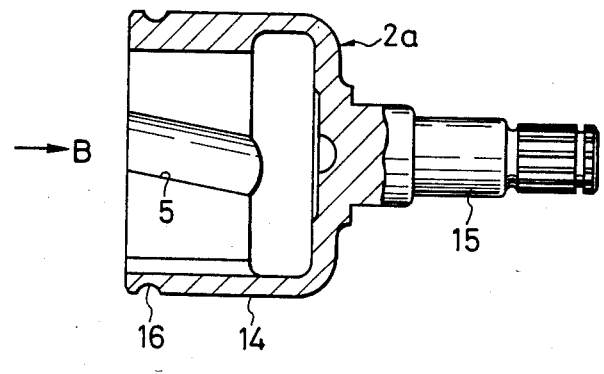
FIG. 4 is a sectional view (which is taken along line V—V of FIG. 5) showing an outerrace of a universal joint having cross grooves in accordance with an example 1 of the present invention.
Figure 5:
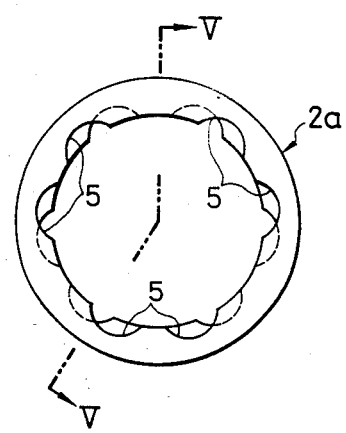
FIG. 5 is a view showing the outerrace of FIG. 4 and taken in the direction of arrow B of FIG. 4.

As shown in FIGS. 4 and 5, an outerrace 2a of this Example is formed by integrally molding a cylindrical portion 14 and a shaft portion 15 to have six cross grooves 5 in the inner face of the cylindrical portion 14 and in pairs at an equal angle with respect one another. The grooves each have a longitudinal axis that extends at an angle to the axis of the cylindrical portion 14. This outerrace 2a is produced: by firstly forging a single steel bar to form an element generally of the outerrace shape; by preparing such an outerrace producing apparatus as will be described herein; by covering a mandrel punch having cross groove forming molds with the aforementioned element; by subsequently pressing the element both from above and sideways in all directions on the exterior to form cross grooves and to forge and form an integrated outerrace and by subsequently forming a boot groove 16 on the exterior of the cylindrical portion of the outerrace and by cutting the shaft portion of the same, as required.

Figure 6:
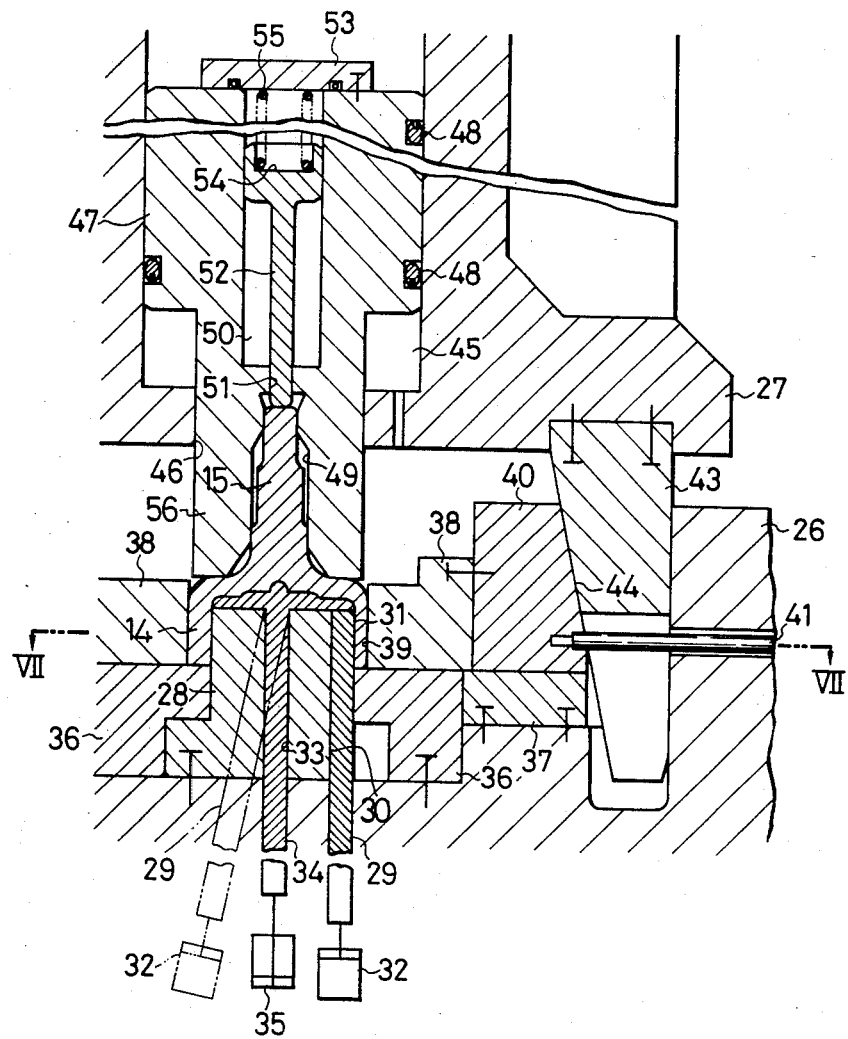
FIG. 6 is a sectional view (which is taken along Line VI—VI of FIG. 7) showing an apparatus which is useful for carrying out an outerrace producing process according to one embodiment of the present invention.
Figure 7:
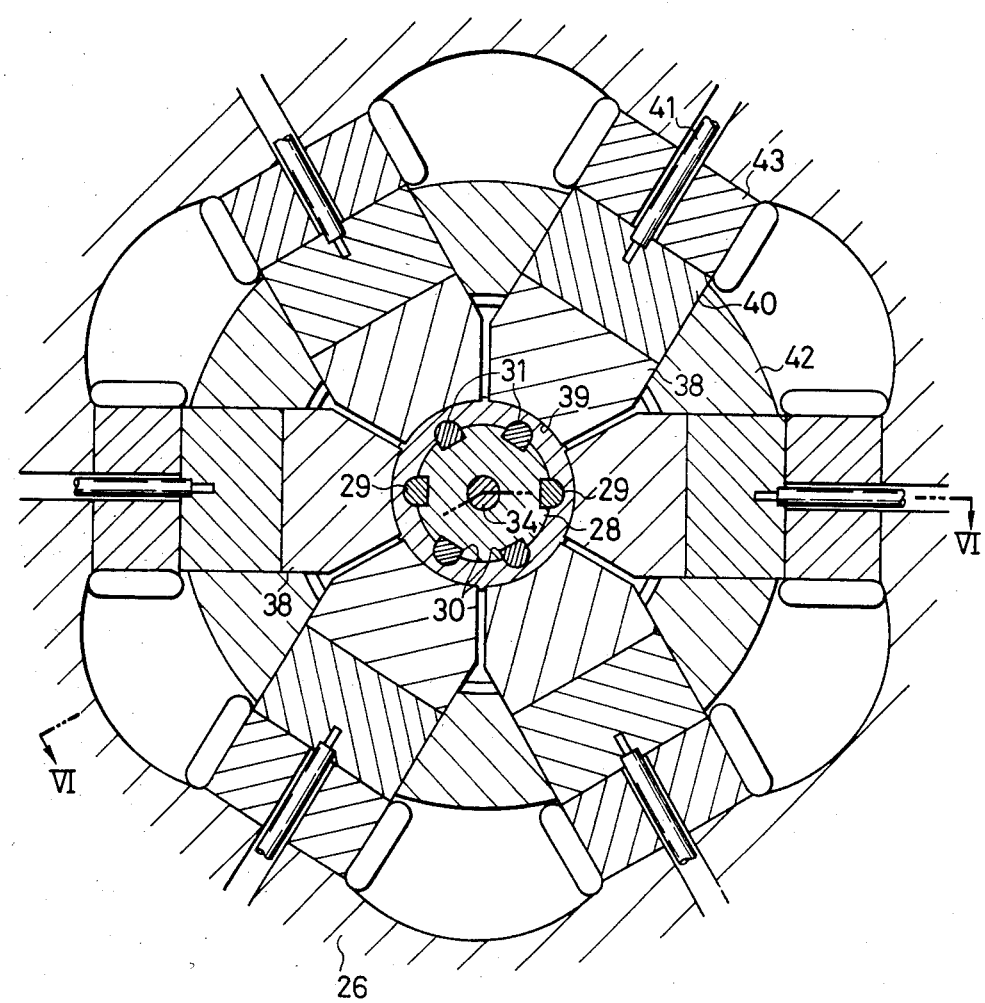
FIG. 7 is a sectional view taken along line VII—VII of FIG. 6.

FIGS. 6 and 7 show an exemplified outerrace producing apparatus. Reference numeral 26 indicates a fixed die, and numeral 27 indicates a vertically movable die. In the center of the die 26, there is fixed a generally column-shaped mandrel punch 28 on which an element 14, 15 having a generally outerrace shape is to be placed. In the outer circumference of the mandrel punch 28, there are arranged six cross groove molds 29 which are fitted obliquely and regularly in fitting grooves 30, respectively (wherein the cross groove molds 29 are equidistantly arranged in the positions of line VII—VII of FIG. 6, as shown in FIG. 7). Each of the cross groove molds 29 has its outer surface formed with a convex molding face 31 corresponding to each of the cross grooves of the outerrace and is connected to a cylinder 32 attached to the die 26 so that it is moved up and down obliquely on the outer circumference of the punch by the action of the cylinder 32 connected to a hydraulic unit (not shown). On the other hand, the mandrel punch 28 and the die 26 are formed with an axially extending knock-out hole 33 in which is fitted a knock-out member 34 having a flanged upper portion. This knock-out member 34 is connected to a cylinder 35 attached to the die 26 so that it is axially moved up and down by the action of the cylinder 35 connected to an hydraulic unit (not shown). The knock-out member may be one extending from the die to the upper face of the mandrel punch but need not have its shape and arrangement limited to that shown.

In the vicinity of the circumference of the mandrel punch 28, there is fixed a mandrel holding mold 36 for holding the punch, around which a slide plate 37 is fixed. The holding mold 36 and the plate 37 have their upper faces positioned at an identical height. With reference to FIG. 7, the holding mold 36 and the plate 37 are overlaid by six forming molds 38 which are arranged around the mandrel punch 28 and at an angularly regular spacing of 60 degrees from one another. The forming molds 38 are formed on their punch-side surfaces with molding faces 39 corresponding to the respective portions of the outer circumference of the cylindrical portion of the outerrace and are fixed in movable molds 40 disposed outside thereof. Each of the molds 40 is connected through a rod 41 to a spring or cylinder (although not shown) on the die 26 so that it is constantly urged away from punch 28. Between each adjacent two of the molds 40, on the other hand, there is fixed a sector guide member 42 which is fixed in abutment against the adjoining molds 40. Moreover, each mold 40 is in sliding engagement with a corresponding drawback member 43, which is fixed on the lower face of the upper die 27, and has its inner sliding face 44 sloped, as shown in FIG. 6. As a result, when the upper die 27 is moved downward, the drawback molds 43 move the molds 40 (and accordingly the forming molds 38) toward the outer circumference of the mandrel punch against the pulling force loaded upon the rods 41. The forming molds 38 may be ones which are so arranged as to come close to or apart from the outer circumference of the mandrel punch, and need not have their number and arrangement limited to the arrangement shown. When the upper die 27 is moved downward to bring the forming molds toward the outer circumference of the mandrel punch so that the element 56 is placed on said punch, press means for pressing said element need not be limited to the drawback molds 43 of the foregoing Example.

On the other hand, the upper die 27 is formed above the mandrel punch 28 with a backing mold chamber 45 which is in communication with the outside through a fitting hole 46. A backing mold 47 is received in backing mold chamber 45 such that it can move up and down through upper packings 48 with its lower end portion extending through the fitting hole 46. The backing mold chamber 45 at its upper end (not shown) is connected to an hydraulic pressure source through a conventional central value (not shown) whereby the backing mold 47 is thrust onto the upper face of the underlying mandrel punch by the oil pressure applied to the chamber 45 above the mold 47. The backing mold 47 is formed inside of its lower end with a molding face 49 corresponding to the shaft portion of the outerrace. Moreover, the backing mold 47 is formed inside of its upper portion with a sweeping chamber 50 which is in communication with the inside of the molding face 49 through a fitting hole 51. A sweeper 52 is accommodated in said sweeping chamber 50 such that its lower shaft portion is fitted in the fitting hole 51. Between a spring retainer 53 fixed on the upper face of the backing mold 47 and a spring hole 54 formed in the upper portion of the sweeper 52, there is retained a spring 55 which biases the sweeper 52 downward.

Next, the process for producing the outerrace of the universal joint by using the apparatus having the construction thus far described will be described below.

Figure 8:
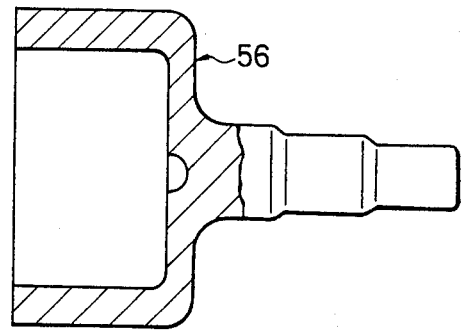
FIG. 8 is a partially sectional view showing an element to be used with the aforementioned apparatus.
Figure 9:
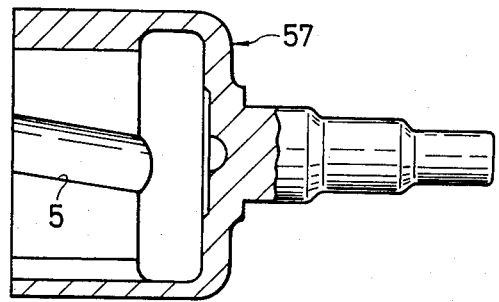
FIG. 9 is a partially sectional view showing an outerrace according to the aforementioned embodiment after it has been forged and formed.

The process is practiced by preparing such an element 56 in advance as has generally an outerrace shape, as shown in FIG. 8; by firstly disposing the mandrel punch 28, which is arranged so that the molds 29 extend obliquely to its central axis on its outer circumference, over the element 56; and by subsequently moving downward the upper die 27, as shown in FIG. 6, until the lower end of the backing mold comes into abutment against the material, to receive the upper portion of the element 56 in the molding face of the backing mold 47. At this time, the element 56 has its upper end contacting the sweeper 52 so that it is urged downward by the elastic force of the spring 55. When the upper die 27 is then moved further downward, the backing mold 47 is thrust downward by the oil pressure (which is regulated to a constant level by a not-shown valve) prevailing therein. Simultaneously with this, the drawback molds 43 force the molds 40 to shift so that the forming molds 38 are brought toward the outer circumference of the mandrel punch 28 to press the side of the element 56 in all directions around the punch. Then, the cylindrical portion 14 of the element 56 is compressed by the forming molds 38, the cross groove molds 29 and the mandrel punch 28 so that its portion is extended downward to abut against the upper face of the mandrel holding mold 36. Simultaneously, the upper portion of the element 56 is extended axially upward and deformed to occupy the inside of the lower portion of the molding face of the backing mold 47. As a result, there is formed an outerrace 57 which is formed with the six cross grooves 5 on the inner face of its cylindrical portion, as shown in FIG. 9.

When the upper die 27 is moved upward, on the other hand, the forming molds 38 are moved outward away from the mandrel punch 28 in accordance with the rise of the drawback molds 43 by an associated rod 41. Meanwhile, the outerrace 57 thus formed is urged by the oil pressure of the backing mold chamber 45 so that it is maintained under pressure on the punch 28. If the upper die 27 is continuously moved upward to a higher level, the backing mold 47 responsively begins to rise so that the formed outerrace 57 is moved apart from the molding face 49 of the backing mold 47 by the force of the spring 55 loaded upon the sweeper 52 until it is left on the mandrel punch 28. After this, the cross groove molds 29 are consecutively moved downward one by one or two by two so that they do not interfere with one another, and the knock-out 34 is then moved upward by the action of the cylinder 35 until the formed outerrace 57 is removed from the mandrel punch 28 and taken out of the apparatus. Then, the formed outerrace 57 thus taken out has its cylindrical portion cut to form the boot groove 16 and its shaft portion cut, as desired, to complete such an outerrace 2a of the universal joint as is shown in FIGS. 4 and 5.

As a result that the cross grooves are formed by the aforementioned plastic working, their cutting and grinding workings can be omitted so that their working time can be remarkably shortened. Moreover, it is confirmed by a suitable strength test that the cross grooves can have their strengths improved better than those of the prior art. Because of the integrated construction of the outerrace moreover, the bolt holes can be omitted so that the cylindrical portion of the outerrace can be far thinner than that of the prior art.

Figure 10:
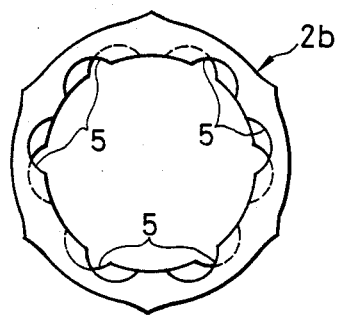
FIGS. 10 and 12 are views showing modifications of the outerrace in which the cylindrical portions have different contours.
Figure 11:
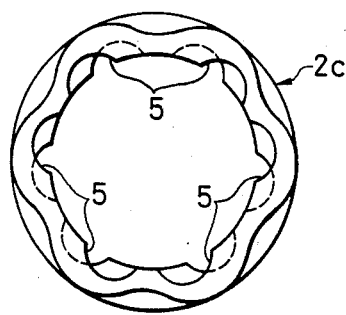
Figure 12:
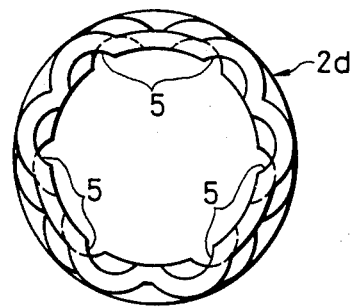

The outerrace 2a of the Example 1 has an outer circumference having a perfectly circular contour, as shown in FIG. 5. Despite this fact, however, the outer circumference of the cylindrical portion of the outerrace may be different, as those of outerrace 2b and 2c shown in FIGS. 10 and 11, or may be made such that the cross grooves 5 have such a uniform depth as is exemplified by an outerrace 2d shown in FIG. 12.

EXAMPLE 2

Figure 13:
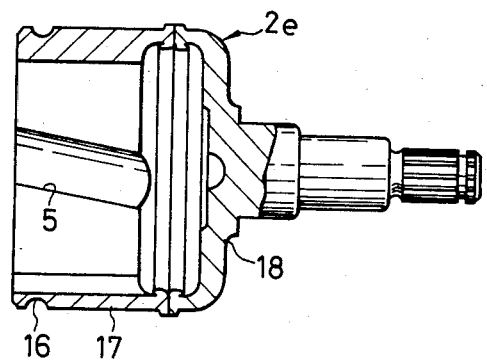
FIG. 13 is a sectional view showing an outerrace of a universal joint having cross grooves in accordance with an example 2 of the present invention.

Turning to FIG. 13, an outerrace 2e of this Example is made by frictionally welding a cylindrical member 17a, which has its inner face formed with six inclined cross grooves 5a, to a shaft member 18. More specifically, the outerrace 2e is produced: by fitting a cylindrical material for the cylindrical portion in a mold having cross groove molding faces; by subsequently pressing the material sideways of the mold in all directions to forge and form the cylindrical member simultaneously with the forming of the cross grooves; by subsequently frictionally welding the formed cylindrical member to the shaft member worked in advance; and by finally forming the boot groove 16. In the outerrace of this Example 2, the working time of the cross grooves 5a is drastically shortened, as compared with that of the prior art, and the cross grooves themselves have their strengths improved better than those of the prior art.

What is claimed is:

1. An apparatus for forging an outerrace of a universal joint having cross grooves, comprising:

a die and a vertically movable upper die;

a mandrel punch fixed in said die and to be inserted into an element having generally an outerrace shape;

a plurality of cross groove molds being disposed on the outer circumference of said punch so that they can move up and down obliquely and being formed on their respective outer surfaces with molding faces corresponding to the cross grooves of said outerrace;

a knock-out extendable from said die to the upper face of said mandrel punch;

a backing mold being disposed above said mandrel punch and supported by said upper die so that it can be thrust downward and having on its lower end a molding face corresponding to the shaft portion of said outerrace;

a plurality of forming mold means being disposed surrounding said mandrel punch, so that said forming molds can move toward and away from said punch, and forming molds having on their respective punch-side surfaces molding faces corresponding to the respective portions of the outer circumference of the cylindrical portion of said outerrace;

and press means for driving said forming molds toward the outer circumference of said mandrel punch to press said material when said upper die moves down.

\* \* \* \* \*